(12) United States Patent
Matsunaga et al.

(10) Patent No.: US 10,402,802 B2
(45) Date of Patent: Sep. 3, 2019

(54) APPARATUS, METHOD, AND PROGRAM FOR SETTING PRINTING FEE BASED ON IMAGE ANALYSIS RESULT

(71) Applicant: CANON KABUSHIKI KAISHA, Tokyo (JP)

(72) Inventors: Daisuke Matsunaga, Yokohama (JP); Yoshikazu Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 14/073,663

(22) Filed: Nov. 6, 2013

(65) Prior Publication Data

US 2014/0129399 A1 May 8, 2014

(30) Foreign Application Priority Data

Nov. 8, 2012 (JP) .................. 2012-246433

(51) Int. Cl.
*G06Q 20/14* (2012.01)
*G07F 17/26* (2006.01)

(52) U.S. Cl.
CPC .......... *G06Q 20/145* (2013.01); *G07F 17/26* (2013.01)

(58) Field of Classification Search
CPC .............................. G06Q 20/145; G06K 15/40
See application file for complete search history.

(56) References Cited

U.S. PATENT DOCUMENTS

| | | | | | |
|---|---|---|---|---|---|
| 5,175,804 | A | * | 12/1992 | Wittmann | G06K 15/00 358/1.8 |
| 5,764,796 | A | * | 6/1998 | Smith | H04N 1/6022 358/504 |
| 6,972,865 | B1 | * | 12/2005 | Muramatsu | H04N 1/00244 358/1.2 |
| 2002/0071142 | A1 | * | 6/2002 | Otani | G06T 1/60 358/515 |
| 2003/0115156 | A1 | * | 6/2003 | Baker | G06Q 30/0283 705/400 |
| 2004/0257593 | A1 | * | 12/2004 | Moffatt | G06F 3/1205 358/1.9 |
| 2004/0257621 | A1 | * | 12/2004 | Ishihara | H04N 1/6072 358/2.1 |
| 2008/0260281 | A1 | * | 10/2008 | Fritz | G06Q 30/0283 382/254 |
| 2010/0195124 | A1 | * | 8/2010 | Has | G06F 17/248 358/1.9 |
| 2012/0257226 | A1 | * | 10/2012 | Okada | H04N 1/233 358/1.9 |
| 2013/0066756 | A1 | * | 3/2013 | Malik | G06Q 30/04 705/34 |
| 2013/0097099 | A1 | * | 4/2013 | Clark | G06Q 30/04 705/400 |

FOREIGN PATENT DOCUMENTS

JP 201232668 A 2/2012

* cited by examiner

*Primary Examiner* — Ramsey Refai (74) *Attorney, Agent, or Firm* — Canon U.S.A., Inc., IP Division (57) ABSTRACT

An apparatus is provided for setting a printing fee based on the result of image analysis. The apparatus determines whether an input image is color or monochrome, obtains the color amount in the input image, performs image processing on the input image, prints the processed input image, and sets a fee for printing the input image based on the obtained color amount.

11 Claims, 5 Drawing Sheets

| ACS DETERMINATION | | SET FEE | | |
|---|---|---|---|---|
| | | MONOCHROME | FULL COLOR | FULL AREA COLOR |
| COLOR | | × (*1) | ○ | ○ |
| MONOCHROME | | ○ | × (*2) | × (*2) |

APPARATUS, METHOD, AND PROGRAM FOR SETTING PRINTING FEE BASED ON IMAGE ANALYSIS RESULT

BACKGROUND

Field

Aspects of the present invention generally relate to an apparatus, a method, and a program for setting a printing fee according to a color or monochrome determination result.

Description of the Related Art

There is known an automatic color select (ACS) determination processing performed to determine which of a color image and a monochrome image an input image is. In the ACS determination processing, which of color and monochrome each pixel in an input image is has been determined, and which of a color image and a monochrome image the input image is has been determined based on the determination result.

In addition to the technology of performing color or monochrome determination for each pixel to determine which of a color image and a monochrome image an input image is, there is known a technology discussed in Japanese Patent Application Laid-Open No. 2012-32668. According to the technology discussed in Japanese Patent Application Laid-Open No. 2012-32668, which of a color block and a monochrome block each block in an input image is has been determined, and a printing fee of the input image has been determined based on the amount of color blocks.

SUMMARY

According to an aspect of the present invention, an apparatus includes a determination unit configured to determine, based on a result of determining whether each pixel in an input image is color or monochrome, whether the input image is color or monochrome, a control unit configured to obtain, based on a result of determining whether each block in the input image is color or monochrome, a color amount of the input image, an input image processing unit configured to perform image processing on the input image based on a result of determining whether the input image is color or monochrome, and to print the input image on which the image processing has been performed, and a setting unit configured to set a fee for the printing based on the obtained color amount.

Further features of the present disclosure will become apparent from the following description of exemplary embodiments with reference to the attached drawings.

DESCRIPTION OF THE EMBODIMENTS

Various exemplary embodiments will be described in detail below with reference to the drawings.

Figure 1:
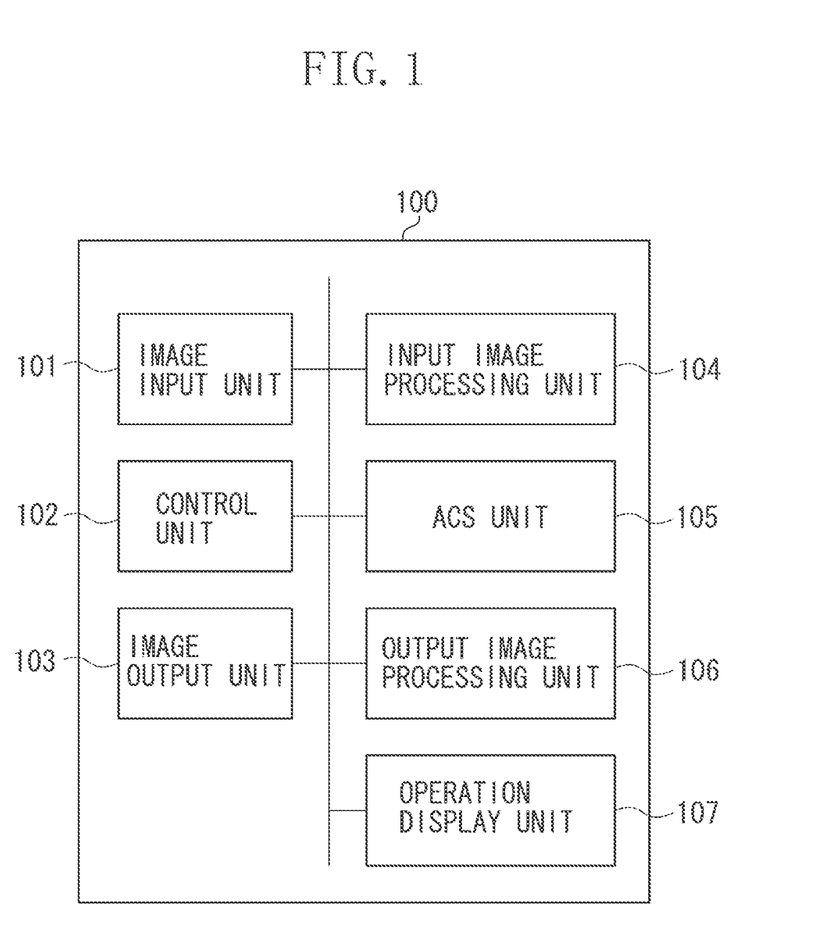
FIG. 1 is a block diagram illustrating an image forming apparatus.

FIG. 1 is a block diagram illustrating an image forming apparatus according to the present exemplary embodiment. The image forming apparatus 100 includes an image input unit 101, a control unit 102, an image output unit 103, an input image processing unit 104, an ACS unit 105, an output image processing unit 106, and an operation display unit 107.

The image input unit 101 includes such a hardware unit as a scanner, and converts an image on a document into a red, green, and blue (RGB) digital image to capture it. Then, the image input unit 101 inputs the captured image to the input image processing unit 104. The image input unit 101 can also receive a RGB digital image from an external apparatus to input it to the input image processing unit 104.

The control unit 102 includes a central processing unit (CPU), a random access memory (RAM), and a read-only memory (ROM). The CPU executes program data included in the ROM while using the RAM as necessary. Processing performed by the control unit 102 will be described in respective steps of flowcharts.

The image output unit 103 includes such a hardware unit as a printer, and prints an image including a digital signal such as a cyan, magenta, yellow, and black (CMYK) signal on an output medium such as paper.

The input image processing unit 104 performs predetermined image processing, such as shading correction processing or off-registration correction processing, on the RGB digital image input from the image input unit 101. Then, the input image processing unit 104 inputs the RGB digital image having been subjected to the predetermined image processing to the ACS unit 105.

The ACS unit 105 is a hardware unit that performs ACS determination processing on the input RGB digital image. The ACS determination processing is processing for determining which of color and monochrome (black and white) the RGB digital image is. In this specification, "which of color and monochrome something is" means "whether something is color or monochrome".

The ACS determination processing specifically includes the following three processes: (1), (2), and (3).

(1) The ACS unit 105 determines which of a color pixel and a monochrome pixel each pixel in the input RGB digital image is. This determination is carried out by a known algorithm. For example, a difference among an R component, a G component, and a B component of the target pixel is calculated, and the target pixel is determined to be a color pixel if a largest value of the difference is larger than a predetermined threshold value, and the target pixel is determined to be a monochrome pixel if smaller.

(2) Then, the ACS unit 105 detects a group of color pixels where a predetermined number or more of color pixels are present in series in either a main scanning direction or a sub-scanning direction. Alternatively, the ACS unit 105 may detect a group of color pixels where a predetermined number or more of color pixels in both a main scanning direction and a sub-scanning direction.

(3) If the number of the detected groups of color pixels in the input image are larger than a predetermined number, the input image is determined to be a color image, and the image input in the other case is determined to be a monochrome image.

The processes of (1), (2), and (3) are performed by pixel units. Desirably, the processes are ended at a stage where the color pixel group satisfying the aforementioned condition is detected. Then, the processing for each pixel, which takes long, can be ended in the midway, and can proceed to subsequent steps.

The RGB digital image having been subjected to the ACS determination processing is input from the ACS unit 105 to the control unit 102.

The output image processing unit 106 performs color conversion processing on the RGB image to obtain a CMYK digital image or a single K color digital image. Then, the output image processing unit 106 performs halftone processing on the obtained CMYK digital image or single K color digital image.

The operation display unit 107 includes such a hardware unit as a liquid crystal display (LCD) touch panel, receives an operation input to the image forming apparatus 100 from a user, and displays a notification to a user from the image forming apparatus 100.

Figure 2:
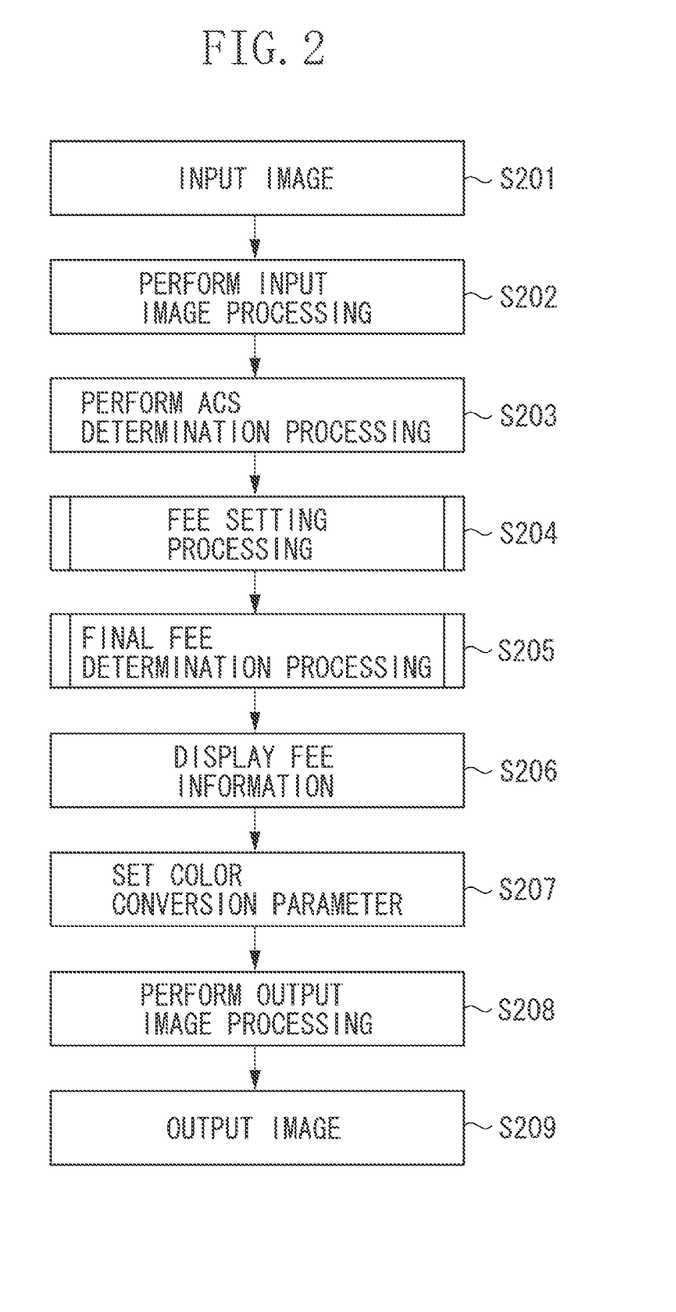
FIG. 2 is a flowchart illustrating an overall copy job operation of the image forming apparatus.

FIG. 2 illustrates an overall flow of processing performed by the image forming apparatus 100.

First, in step S201, the image input unit 101 inputs the RGB digital image to the input image processing unit 104. Then, in step S202, the input image processing unit 104 performs the aforementioned predetermined image processing on the input RGB digital image, and inputs the RGB digital image having been subjected to the predetermined image processing to the ACS unit 105.

In step S203, the ACS unit 105 performs the aforementioned ACS determination processing on the input RGB digital image, and inputs the RGB digital image having been subjected to the ACS determination processing to the control unit 102.

In step S204, the control unit 102 performs fee setting processing based on the input RGB digital image. This processing will be described below referring to FIG. 3.

In step S205, the control unit 102 determines a final fee based on a result of the ACS determination processing in step S203 and a result of fee setting processing in step S204. This processing will be described below referring to FIGS. 4 and 5.

Then, in step S206, the control unit 102 causes the operation display unit 107 to display the determined final fee as fee information. In this step, a step to obtain fee approval from a user via the operation display unit 107 can be included. In other words, if the user presses an OK button after checking the displayed fee, processing in step S207 and after can be started. If the user presses an NG button, the processing in step S207 and after can be canceled (printing can be cancelled). It is desirable to display not only the fee information but also a thumbnail image of the input image. This step does not always need to be carried out. The control unit 102 can immediately proceed to step S207 after step S205 omitting this step.

Then, in step S207, the control unit 102 sets a color conversion parameter for the output image processing unit 106 based on the result of the ACS determination processing in step S203. Specifically, the control unit 102 sets a color conversion parameter for a monochrome image if the ACS determination result is the monochrome image, and a color conversion parameter for a color image if the ACS determination result is the color image. The color conversion parameter for the monochrome image is a parameter for converting the RGB digital image into a single K color digital image, while the color conversion parameter for the color image is a parameter for converting the RGB digital image into a CMYK digital image. Particularly, the color conversion parameter for the color image is desirably a parameter for converting an RGB value of pixels included in the RGB digital image into a value of single K color pixel if the values of the R component, the G component, and the B component of the pixels are close to one another (if each difference therebetween is equal to or less than a predetermined threshold value). If any of the difference therebetween is larger than the predetermined threshold value, the color conversion parameter for the color image is desirably a parameter for converting the RGB value of the pixels into a CMYK value (CMYK value where none of CMY values is 0). The predetermined threshold value is desirably identical to that used for the ACS determination.

After the end of the processing, the control unit 102 inputs the RGB digital image input from the ACS unit 105 to the output image processing unit 106.

Then, the output image processing unit 106 performs color conversion processing on the input RGB digital image by using the set color conversion parameter. Then, the output image processing unit 106 performs halftone processing on the CMYK or single K color digital image obtained by the color conversion processing. Then, in step S208, the output image processing unit 106 inputs a halftone processing result to the image output unit 103.

Finally, in step S209, the image output unit 103 prints the input image (image processing result after image processing such as color conversion processing and halftone processing).

Figure 3:
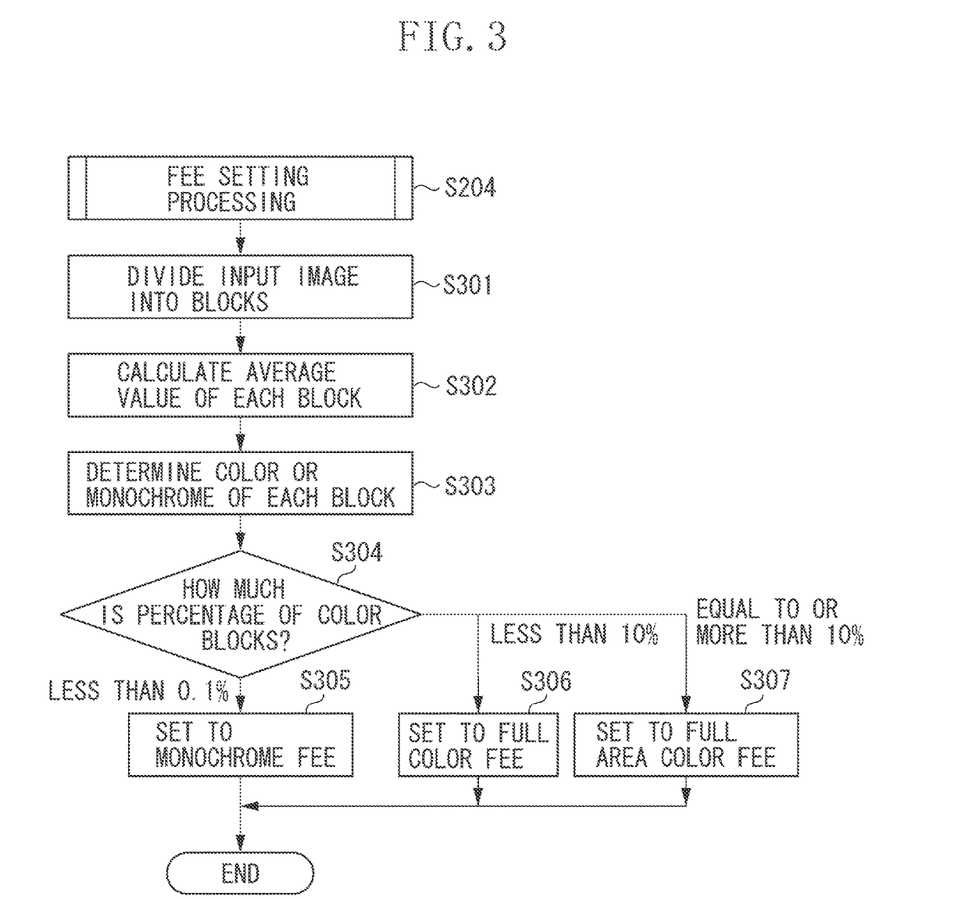
FIG. 3 is a flowchart illustrating fee setting processing in detail.

FIG. 3 illustrates a detailed processing flow of fee setting processing step S204 illustrated in FIG. 2.

In step S301 in the fee setting processing step S204, the control unit 102 divides the input image into a plurality of blocks. In step S302, the control unit 102 calculates an average value of RGB luminance in each block. In the description below, the block is assumed to be a region of 32 pixels×32 pixels. However, the block can be a region of another size. In the present exemplary embodiment, a value to be calculated is assumed to be an average value of RGB luminance. However, another value such as a weighted average value can be used.

In step S303, the control unit 102 determines which of a color block and a monochrome block each block is, based on the calculated average value. This determination is carried out by a known algorithm. For example, a difference among an R component, a G component, and a B component of the average value of the RGB luminance of a target block is calculated, and the target block is determined to be a color block if a largest value of the difference is larger than a predetermined threshold value, and the target block is determined to be a monochrome block if smaller. This threshold value can be identical to that used for ACS determination processing. However, the threshold value used in this step is desirably smaller than the threshold value used for the ACS determination processing. It is because if 100 pixels in a certain block are color pixels while 924 pixels are monochrome pixels, most of the pixels are monochrome pixels, and thus a difference among the R component, the G component, and the B component of the average value of the block is relatively small. Even if the difference is small, to determine that the bock is a color block, the threshold value used in this step is desirably set to a relatively small value.

The determination algorithm is not limited to this algorithm. For example, a method of converting the RGB luminance into YUV luminance and comparing a total of $U^2$ and $V^2$ with a threshold value can be employed.

Then, in step S304, the control unit 102 counts the number of blocks determined to be color blocks, and divides the result by the number of blocks included in the input image to obtain a percentage of color blocks in the entire blocks. If the percentage of the color blocks is less than a first threshold value (0.1%), in step S305, the control unit 102 sets a printing fee of the image to a monochrome fee (e.g., 10 yen). If the percentage of the color blocks is equal to or more than the first threshold value and less than a second threshold value (10%), in step S306, the control unit 102 sets the printing fee of the image to a full color fee (e.g., 20 yen). If the percentage of the color blocks is equal to or more than 10%, in step S307, the control unit 102 sets the printing fee of the image to a full area color fee (e.g., 40 yen). The description is based on the examples of threshold values of 0.1% and 10%. However, other threshold values can be used provided that the second threshold value is larger than the first threshold value.

Thus, concerning fee setting, the control unit 102 further divides, rather than the two-stage division of the monochrome image and the color image, the color image into a full color image and a full area image according to the percentage of the color blocks. Then, the control unit 102 performs fee setting for each page according to the division, and causes the operation display unit 107 to display a total amount of each job in the fee information display step S206. The operation display unit 107 can be caused to display all fees of the respective pages. A step to obtain fee approval from a user can also be included as described above.

A thumbnail image can be formed by collecting average values of the blocks obtained in step S302. The control unit 102 can cause the operation display unit 107 to display the thumbnail image together with the fee information during displaying of the fee information.

Figure 4:
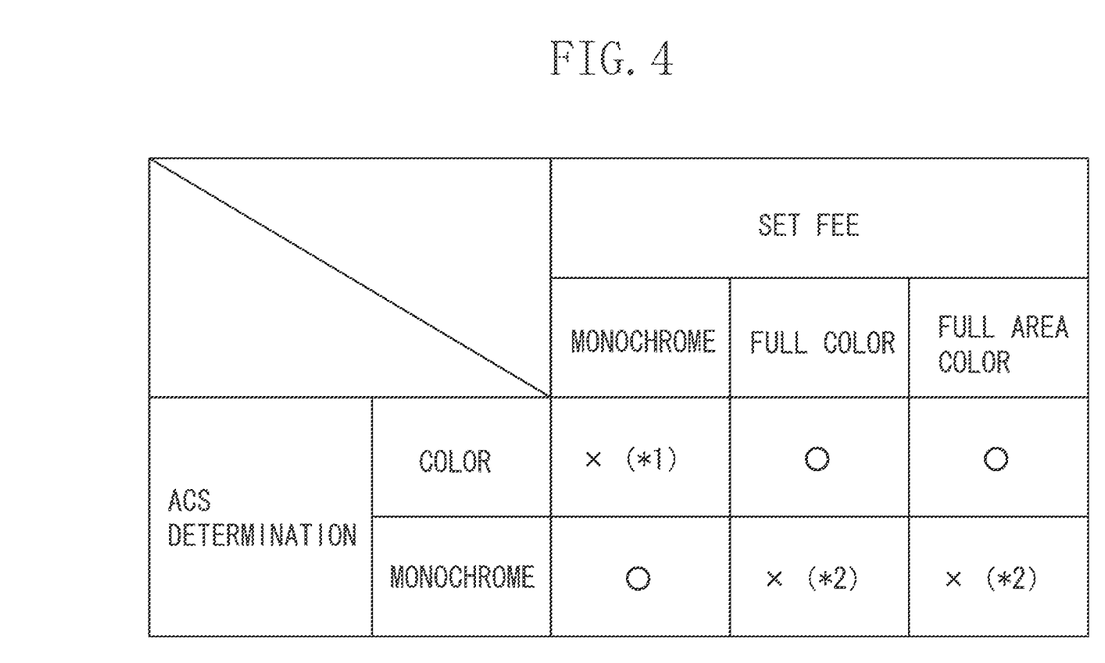
FIG. 4 illustrates a table indicating a difference between an ACS determination result and a set fee.

FIG. 4 illustrates a table indicating a difference between a set fee and an ACS determination result.

Rows in the table represent an ACS determination result, and columns in the table represent a set fee.

A cell of each combination represents whether both are consistent with each other. A combination with a circle (○) indicates a consistent combination, while a combination with a cross (x) indicates an inconsistent combination. For example, if an ACS determination result is color and a set fee is a monochrome fee (*1 illustrated in FIG. 4), although a color image is printed, a set fee is a monochrome fee. If an ACS determination result is a monochrome and a set fee is a full color fee or a full area color fee (*2 illustrated in FIG. 4), although a monochrome image is printed, a set fee is a color fee. In the final fee determination processing step S205, such a difference is eliminated to achieve consistency.

Figure 5:
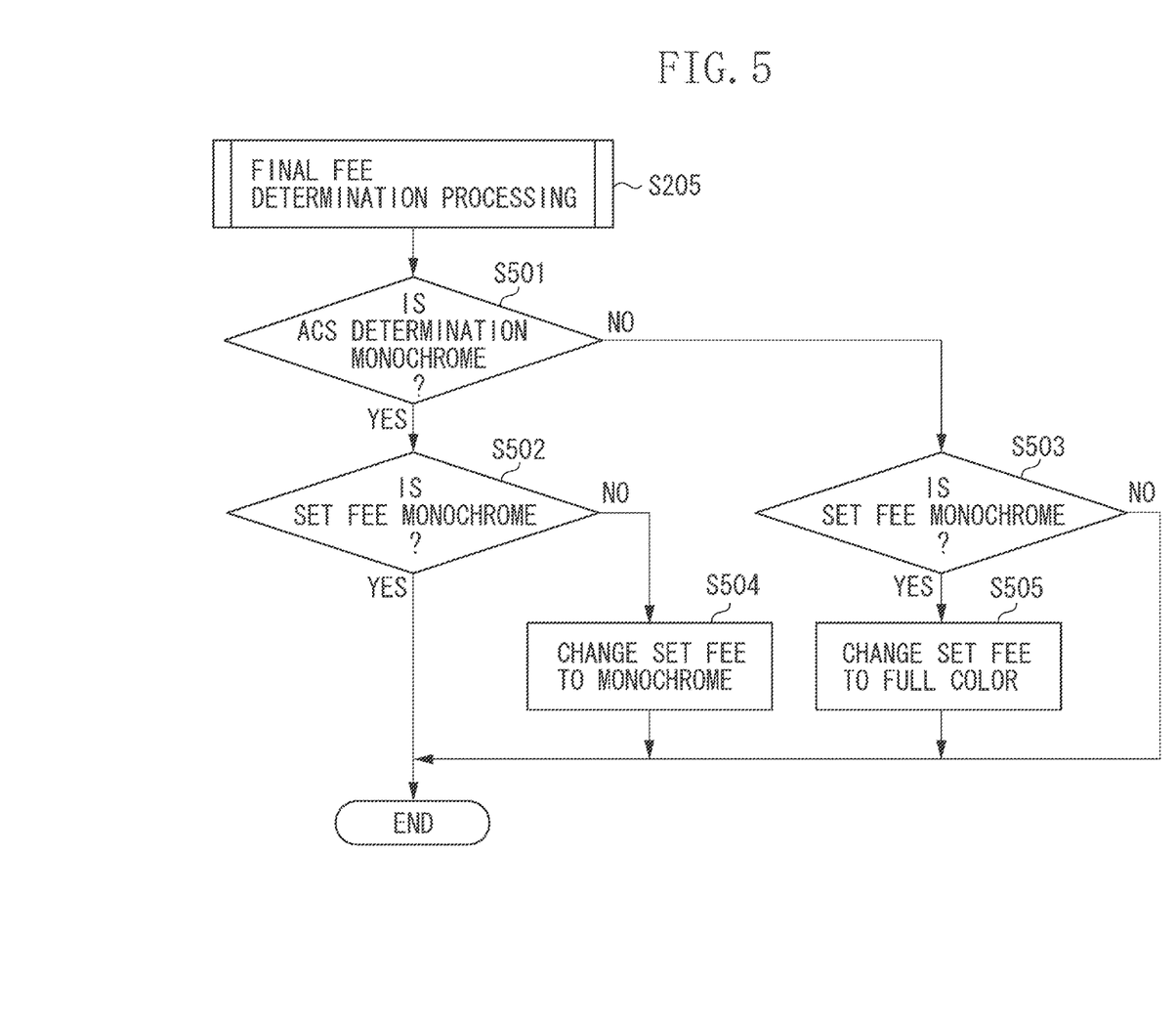
FIG. 5 is a flowchart illustrating final fee determination processing based on the ACS determination result and the set fee.

FIG. 5 illustrates a detailed processing flow of the final fee determination processing step S205.

In step S501 in the final fee determination processing step S205, the control unit 102 checks which of monochrome and color an ACS determination result is. In steps S502 and S503, the control unit 102 checks which of a monochrome fee and other color fees a set fee is.

If both are monochrome (YES in step S501 and YES in step S502), and if both are not monochrome (NO in step S501 and NO in step S503), both the ACS determination result and the set fee are consistent with each other, and thus the set fee is not changed. If the ACS determination result is monochrome while the set fee is not a monochrome fee (YES in step S501 while NO in step S502), in step S504, the control unit 102 changes the set fee from a full color fee or a full area color fee to a monochrome fee. It is based on a point of view that if monochrome printing is performed, a fee should be a monochrome fee.

If the ACS determination result is color while the set fee is a monochrome fee (NO in step S501 while YES in step S503), in step S505, the control unit 102 changes the set fee from a monochrome fee to a full color fee. It is based on a point of view that if color printing is performed, a fee should be a color fee. Since it can be considered that there are not so many color regions in the input image as long as the set fee is a monochrome fee, the set fee is changed not to a full area color fee but to a full color fee.

Thus, an appropriate fee can be determined by changing the set fee according to the ACS determination result.

It has been described that the block is a region of 32 pixels×32 pixels. However, the block can be a region of another size. For example, the block can be a square region of 10 pixels×10 pixels, a rectangular region of 10 pixels×15 pixels, or even a region of another shape such as a circular shape. The blocks do not need to be equal in size. For example, a block of 20 pixels×3 pixels can be present while a block of 10 pixels×10 pixels is present.

However, if the input image is divided into a plurality of blocks having such different sizes, care must be taken in the processing in step S304. Rather than simply counting the number of color blocks to calculate the percentage of color blocks in the entire blocks, a percentage of an area of color blocks in the total area of the input image must be calculated in view of differences in block sizes.

All the aforementioned descriptions are based on the examples using the percentage. However, fee setting can be carried out by simply using the number of color blocks or the area of the color blocks without using the percentage. It is assumed that a term "amount" includes both a number and an area. Thus, a color amount includes both the number of color blocks and the area of color blocks.

It has been described that the printing is canceled if a user presses the NG button. However, the following can be employed. Specifically, if a user presses the NG button, the control unit 102 causes the operation display unit 107 to display an inquiry to the user as to which part of the thumbnail image is subjected to monochrome printing. If the user performs an operation of selecting a partial region of the thumbnail image on the operation display unit 107 in response, the control unit 102 sets the selected region to a monochrome region. Then, the control unit 102 transmits the set monochrome region to the output image processing unit 106. Concerning the monochrome region, the output image processing unit 106 converts an RGB value of pixels included in the region into a value of single k color pixel by using a color conversion parameter for a monochrome image. In step S304, the control unit 102 treats the monochrome region as a monochrome block even if color blocks are included in the monochrome region. As a result, the control unit 102 sets a fee based on the percentage of color blocks included in regions other than the monochrome region in the entire blocks. The control unit 102 causes the operation display unit 107 to display the set fee again, and receives approval from the user to proceed to step S207 and after.

The two-stage color fee setting, i.e., the full color fee and the full area color fee, has been described. However, more stages can be prepared.

The embodiments can be achieved by performing the following processing. That is, software (program) for realizing the functions of the aforementioned exemplary embodiment is supplied to a system or an apparatus via a network or various storage media, and a computer, CPU, or microprocessor unit (MPU) of the system or the apparatus reads the program to execute it.

In the present exemplary embodiment, the color or monochrome determination for image processing or printing is carried out by pixel units, and the color or monochrome determination for fee setting is carried out by block units. This enables highly precise determination for image processing or printing, which are of the most importance, and speedy determination for fee setting.

If this arrangement is used, as compared with the case where the determination for fee setting is carried out in the ACS unit 105, the processing of the ACS unit 105 having a heavy processing load tends to end faster, and time from inputting of the image to outputting tends to be shorter. A reason for the faster end of the processing of the ACS unit 105 realized by using the arrangement is that the ACS unit 105 can end the processing at a stage where a color pixel group satisfying the aforementioned condition is detected. If the determination for fee setting is carried out in the ACS unit 105, the ACS unit 105 must continue the determination until the number of color pixels exceeds the second threshold value (e.g., 10%), thus taking time. The present exemplary embodiment can solve these problems.

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2012-246433, filed Nov. 8, 2012, which is hereby incorporated by reference herein in its entirety.

What is claimed is:

1. An image processing apparatus comprising:
a printer;
one or more processors; and
a memory storing a program which, when executed by the one or more processors, causes the image processing apparatus to:
determine whether an RGB digital image has a predetermined number of contiguous color pixels in series;
determine whether the RGB digital image is a color image or a monochrome image based on the determination whether the RGB digital image has the predetermined number of contiguous color pixels in the series;
determine whether each block having a plurality of pixels in the RGB digital image is color based on pixel values of the pixels;
determine a fee division for printing from among three or more fee divisions for printing based on the number of blocks determined to be color, wherein the fee divisions include one monochrome fee and two or more color fees;
set one of the color fees based on the determined fee division for the RGB digital image determined to be the color image, and set the monochrome fee for the RGB digital image determined to be the monochrome image even if the determined fee division is one of the color fees; and
convert the RGB digital image determined to be the color image into a CMYK image, and convert the RGB digital image determined to be the monochrome image into single K image data,
wherein the printer prints the converted CMYK image or single K image data.

2. The image processing apparatus according to claim 1, wherein in a case where the RGB digital image has been determined to be a color image and the determined fee division for printing is the lowest fee division among the three or more fee divisions for printing, the determined fee division for printing is changed to another fee division, different from the lowest fee division, among the three or more fee divisions for printing.

3. The image processing apparatus according to claim 1, wherein execution of the program causes the image processing apparatus to calculate an average value of blocks in the RGB digital image, determine, based on the average value, whether each of the blocks is color or monochrome, and determine the fee division for printing based on a determination result of the block.

4. The image processing apparatus according to claim 1, further comprising a display unit, wherein the set fee is displayed on the display unit.

5. The image processing apparatus according to claim 1, wherein execution of the program causes the image processing apparatus to determine that the RGB digital image is a color image at a point in time when a number of color pixels included in the RGB digital image exceeds a threshold value, and
wherein, when a number of color pixels included in the RGB digital image exceeds the threshold value, the image processing apparatus cancels the determination of whether the RGB digital image is color or monochrome for remaining pixels included in the RGB digital image.

6. A method of controlling an image processing apparatus, the method comprising:
determining whether an RGB digital image has a predetermined number of contiguous color pixels in series;
determining whether the RGB digital image is a color image or a monochrome image based on the determination whether the RGB digital image has the predetermined number of contiguous pixels in series;
determine whether each block having a plurality of pixels in the RGB digital image is color based on the pixel values of the pixels;
determining a fee division for printing from among three or more fee divisions for printing based on the number of blocks determined to be color, wherein the fee divisions include one monochrome fee and two or more color fees;
setting one of the color fees based on the determined fee division for the RGB digital image determined to be the color image, and setting the monochrome fee for the RGB digital image determined to be the monochrome image even if the determined fee division is one of the color fees;

converting the RGB digital image determined to be the color image into a CMYK image, and converting the RGB digital image determined to be the monochrome image into single K color image data; and printing the converted CMYK image or single K color image data.

7. The method according to claim 6, wherein in a case where the RGB digital image has been determined to be a color image and the determined fee division for printing is the lowest fee division among the three or more fee divisions for printing, the determined fee division for printing is changed to another fee division, different from the lowest fee division, among the three or more fee divisions for printing.

8. The method according to claim 6, further comprising: calculating an average value of blocks in the RGB digital image, determining, based on the average value, whether each of the blocks is color or monochrome, and determining the fee division for printing based on a determination result of the block.

9. The method according to claim 6, further comprising displaying the set fee on a display unit.

10. The method according to claim 6, further comprising:
determining that the RGB digital image is a color image at a point in time when a number of color pixels included in the RGB digital image exceeds a threshold value; and
canceling the determination of whether the RGB digital image is color or monochrome for remaining pixels included in the RGB digital image.

11. A non-transitory computer-readable storage medium for storing a program thereon for causing a computer to execute an image processing method, the method comprising:
determining whether an RGB digital image has a predetermined number of contiguous color pixels in series;
determining whether the RGB digital image is a color image or a monochrome image based on the determination whether the RGB digital image has the predetermined number of contiguous pixels in series;
determine whether each block having a plurality of pixels in the RGB digital image is color based on the pixel values of the pixels;
determining a fee division for printing from among three or more fee divisions for printing based on the number of blocks determined to be color, wherein the fee divisions include one monochrome fee and two or more color fees;
setting one of the color fees based on the determined fee division for the RGB digital image determined to be the color image, and setting the monochrome fee for the RGB digital image determined to be the monochrome image even if the determined fee division is one of the color fees;
converting the RGB digital image determined to be the color image into a CMYK image, and converting the RGB digital image determined to be the monochrome image into single K color image data; and
printing the converted CMYK image or single K color image data.

* * * * *